United States Patent
Meythaler et al.

(10) Patent No.: US 6,901,933 B2
(45) Date of Patent: *Jun. 7, 2005

(54) APPARATUS FOR SIMULATING TRAUMATIC BRAIN INJURY AND METHOD FOR INDUCING SPINAL CORD INJURY

(75) Inventors: Jay M. Meythaler, Birmingham, AL (US); Jean D. Peduzzi-Nelson, Chelsea, AL (US); Evangelos Eleftheriou, Hoover, AL (US)

(73) Assignee: The UAB Research Foundation, Birmingham, AL (US)

( * ) Notice: Subject to any disclaimer, the term of this patent is extended or adjusted under 35 U.S.C. 154(b) by 13 days.

This patent is subject to a terminal disclaimer.

(21) Appl. No.: 10/429,356

(22) Filed: May 5, 2003

(65) Prior Publication Data

US 2004/0035433 A1 Feb. 26, 2004

Related U.S. Application Data

(63) Continuation-in-part of application No. 09/913,017, filed as application No. PCT/US00/03182 on Feb. 8, 2000, now Pat. No. 6,588,431.
(60) Provisional application No. 60/118,986, filed on Feb. 8, 1999.

(51) Int. Cl.$^7$ .............................. A61B 19/00; A01K 1/01
(52) U.S. Cl. ...................................... 128/897; 119/452
(58) Field of Search ............................... 128/897–899; 119/417, 418, 453, 459, 467, 468, 497, 708, 609, 706, 707, 756, 723, 757, 452; 224/422; 217/62; 220/213, 377; 312/307; 210/169, 232, 416.2, 435

(56) References Cited

U.S. PATENT DOCUMENTS

| | | | | |
|---|---|---|---|---|
| 2,522,391 A | * | 9/1950 | McGonigle | 119/453 |
| 4,762,130 A | | 8/1988 | Fogarty et al. | |
| 4,869,206 A | * | 9/1989 | Spina | 119/417 |
| 5,357,905 A | * | 10/1994 | Gordon | 119/708 |
| 5,431,129 A | * | 7/1995 | Clark | 119/468 |
| 5,577,646 A | * | 11/1996 | White | 224/422 |
| 6,066,158 A | | 5/2000 | Engelson et al. | |
| 6,588,431 B1 | * | 7/2003 | Meythaler et al. | 128/897 |

OTHER PUBLICATIONS

"A Multicenter Trial of the Efficacy of Nimodipine on Outcome after Severe Head Injury", J. Neurosurg., 1994, 80: 797–804.
"Cerebral Arterial Spasm a Controlled Trial of Nimodipine in Patients with Subarachnoid Hemmorage", All GS, Ahn, HS, Preziosi, TJ et al., N. Eng. J. Med., 1984, 308: 619–624.
"Neuropathology of Head Injury", Graham D.I., 4: 43–59.

* cited by examiner

Primary Examiner—Samuel G. Gilbert
Assistant Examiner—Nikita R. Veniaminov
(74) Attorney, Agent, or Firm—Gifford, Krass, Groh, Sprinkle, Anderson, Citkowski, P.C.

(57) ABSTRACT

This invention is an apparatus for simulating human traumatic injury in an animal, said apparatus comprising a support having an aperture having end walls and side walls disposed therein; a sliding element slidingly engaged with said side walls of said aperture, said sliding element having a retainer disposed thereon for receiving an animal holder having a hinged first end therein; and a crank arm operatively connected to both said sliding element, and an actuator mechanism. The apparatus allows animal head motion simulative of hyperflexural trauma associated with actual injuries.

11 Claims, 4 Drawing Sheets

APPARATUS FOR SIMULATING TRAUMATIC BRAIN INJURY AND METHOD FOR INDUCING SPINAL CORD INJURY

RELATED APPLICATIONS

This application is a continuation-in-part of U.S. patent application Ser. No. 09/913,017 filed Sep. 28, 2001 now U.S. Pat. No. 6,588,431, which is the U.S. national phase of PCT Patent Application PCTUS/00/03182 filed Feb. 8, 2000, which in turn claims priority of U.S. Provisional Patent Application Ser. No. 60/118,986 filed Feb. 8, 1999.

FIELD OF THE INVENTION

The subject invention relates to an apparatus and method for simulating human central nervous system injuries and, more particularly, the subject invention relates to an apparatus and method for animal simulation of human traumatic brain injury and spinal cord injury.

BACKGROUND OF THE INVENTION

The predominant mechanism in most cases of traumatic brain injury (TBI) is diffuse axonal injury (Whyte and Rosenthal, 1993). While axonal injury is common in all TBI regardless of severity (Povlishock et al., 1992; Mittl, 1994), a shearing of the axons occurs in human diffuse axonal injury (DAI) leading to progressive changes that ultimately may result in the loss of connections between nerve cells. The slow progression of events in DAI continues for up to several weeks after injury creating a window of opportunity for therapeutic intervention. Up to now, there are no consistently reproducible small animal models for DAI which closely mimic the changes associated with DAI in humans (Maxwell et al., 1997; Povlishock, 1993). Without such a model to study the mechanism of injury, it is difficult to develop prevention and/or interventional methodologies to limit the extent of injury. In part, this may explain the lack of efficacy of the clinical trials to assess various medications to limit injury in TBI.

There are approximately 500,000 new cases of TBI in the U.S. each year (Frankowski, 1985), and the incidence requiring hospitalization is estimated to be approximately 200–225/100,000 population (Frankowski, 1986; Carus, 1993). Currently, it is estimated that brain injuries account for 12% of all hospital admissions in the United States (Sandel, 1993). When compared to spinal cord injury, which accounts for less than 1% of hospital admissions, it is clear that TBI is a medical care problem which has a significant impact financially within the United States. Approximately 30,000–44,000 people will survive a severe TBI with GCS score <9 (Glasgow Coma Score Scale, Jennett, 1981) in the U.S. each year and more than 70,000 will be significantly disabled from moderate to severe TBI (GCS≦10) (Whyte & Rosenthal, 1988). Yet with new medical management techniques, less than 10% will remain in a persistent vegetative state (Whyte, 1993; Rosner, 1992; Rosner, 1990). A GCS score of eight or less generally reflects a state of unconsciousness in which the patient demonstrates no eye opening, does not follow simple commands to move muscles, and has vocalizations which are limited to sounds. Such signs are indicative of severe brain injury (Whyte, 1993; Jennett, 1975, Jennett, 1981).

Approximately 52,000 to 56,000 people die each year from TBI (Kraus et al., 1996), resulting in direct costs approximated at more than $50 billion annually (Max et al., 1991). The costs of severe TBI to the individual and family are extremely high (McMordie, 1988). Acute medical and rehabilitation bills are often around $100,000 with some considerably higher (McMordie, 1988). The Model Systems Database for Traumatic Brain Injury demonstrates there is a correlation between the average Disability Rating Score and the combined acute care and rehabilitation charges (Bullock et al., 1995). Those with a severe TBI (GCS score of 6–8) have average combined charges of $110,842, and those with a very severe TBI (GCS score 3–5) have average combined charges of $154,256 (Lehmkuhl, 1993). About one-half of all TBIs are transportation related (Whyte, 1993; Lehmkuhl, 1993) and these patients have some of the highest combined charges for acute care and rehabilitations (Lehmkuhl, 1993). This may be related to the mechanism of TBI in high speed motor vehicle crashes, specifically the presence of diffuse axonal injury (DAI) being most prevalent in the midbrain and brain stem areas (Whyte, 1993). Clearly, brain injuries of this severity that occur with high speed acceleration-deceleration injuries, have the highest costs to society. TBI clearly causes more mortality, morbidity and probably more economic loss than HIV infection in the United States.

Motor vehicle crashes of all types are responsible for approximately 40%–50% of the TBI admissions recorded in the Model TBI Systems Database (Lehmkuhl, 1993). The predominant mechanism of injury is considered to be diffuse axonal injury (DAI). Approximately 30%–40% of the fatal head injuries involve diffuse axonal injury by pathological examination (Bennett et al., 1995; McLellan, 1990). However, based on beta-amyloid precursor protein immunostaining, axonal injury may be present in all cases of fatal head injury (Gentleman et al., 1995). In cases of persistent vegetative states, Kampfl et al. (1998) recently found that all cases had evidence of DAI in magnetic resonance imaging (MRI). Diffuse axonal injury occurs even in the absence of a blow to the head and is more prevalent than previously realized. Even in mild head injury, diffuse axonal injury is present in almost ⅓ of the cases (Mittl et al., 1994). The defining characteristic of DAI is the morphologic change to the axons which occurs over the course of several days to weeks and the fact that multiple regions of the brain are injured. While a component of DAI is present in blunt or penetrating trauma injury, it is at the periphery of the injury zone and is much less significant than the predominant mechanism of injury. DAI is the major mechanism of injury in high speed acceleration-deceleration injuries associated with motor vehicle crashes. While all four mechanisms of TBI (DAI, blunt trauma, penetrating trauma, axonia) may be involved in such an injury, it is the predominant mechanism of injury under this condition.

Diffuse axonal injury is only one of the cellular mechanisms of traumatic brain injury. The others include such things as direct contusion to the cells, intracerebral hemorrhage (blood across the blood brain barrier), perfusion-reperfusion injury, and anoxia. In a high velocity TBI such as those sustained in a car accident and the subsequent sequelae one can have several mechanisms of cellular injury. Each of these mechanisms appears to cause a unique area and type of TBI. This also indicates that each type of cellular injury activates different cellular pathways and cellular channels. For instance, the sequelae of brain injury from a subtype of intracerebral hemorrhage described as subarachnoid hemorrhage (both spontaneous and traumatic) appears to respond to L-type Ca channel blockers but these same substances have not been protective in another type of TBI (European Study Group on Nimodipine in Severe Head Injury, "A Multicenter Trial of the Efficacy of Nimodipine on Outcome after Severe Head Injury", J. Neurosurg., 1994, 80:797–804; Allen G S, Ahn, H S, Preziosi, T J, et al., "Cerebral Arterial Spasm—a Controlled Trial of Nimodipine in Patients with Subarachnoid Hemorrhage", N. Eng. J. Med., 1983, 308:619–624). It is clear that other types of channels, including Ca channels, may be involved in other types of cellular injury.

In DAI, when enough force is applied to the cytoplasm of the neuronal cell, the elastic memory of the substance is exceeded. Then the amount of cytoplasmic deformation is directly related to the time the force is applied. This in turn relates to the amount of cytoskeletal disruption that occurs. Applicant's work has proven, with this device, that the severity of neuronal injury that occurs when a rat is injured at a defined Hertz is related to the length of time the force is applied. Furthermore, that many of the same areas of the brain have cellular disruption (corpus callosum, mesencephalon and brain stem) as is noted in humans who have suffered high velocity TBI as is noted in motor vehicle crashes. It is understood that many who have suffered a TBI in a cause similar to a motor vehicle crash may have more than one mechanism of neural cell injury. The injury inducing methods enabled by this machine will allow applicants to analyze the causes and the subsequent effects of DAI on neuronal cells and allow testing of unique compounds to protect against further neural cell death and injury without any of the other confounding, and many times masking, causes of neural cell injury being involved. In the model described the cellular disruption was not accompanied by intracerebral hemorrhage, or contusion and does not involve primarily perfusion-reperfusion or anoxic injury to the neuronal cells. By limiting the type of injury to a single type, applicant's can now study the mechanism of injury, its biochemical interactions and unique compounds to protect against neural cell injury. The foundation of the inventions in this application is its isolation of this single injury type, and the subsequently derived methods of testing for mitigation, methods of investigative research, and methods of treatment based on this uniquely isolated injury type. This is also important because DAI is, in many cases, especially in auto and other inertia caused injuries, the predominate injury type.

Many of the areas that are injured in DAI are contiguous to the areas of cerebrospinal fluid (CSF) circulation in the brain. They are thus readily accessible to treatment via diffusion with substances delivered into the CSF for circulation and such diffusion into the injured areas.

For human head injuries resulting from car collisions, the average velocity for the onset of severe injuries is 6.7 m/s (or 24.1 km/hour) as mentioned by Lorenzo et al. (1996). Most studies have been directed to the analysis of impact to the head. The Head Injury Criterion (HIC) is one method that is commonly used to assess the severity of an impact (Chou and Nyquist, 1974). Although it is considered to be the best available head injury indicator, a new finite element model using a dummy head has taken into account the effects of rotational and translational acceleration (Ueno and Melvin, 1995). Using this model, the dominant effect of translational acceleration was on principal stresses and rotational acceleration was on shear stresses.

Based on studies of head injury in primates (including man), some of the mechanical forces which bring about DAI (McLellan, 1990) have been elucidated. The crucial factors are (1) the type of acceleration/deceleration (angular rather than translational), (2) the duration of acceleration/deceleration (long rather than short), and (3) the direction of head movement (coronal rather than sagittal). Clearly angular acceleration or the associated sudden deceleration associated with an "impact" will create forces above the threshold level (McLean and Anderson, 1997). Indeed most, but not all shaken baby syndromes are characterized by a sudden deceleration (Duhaime et al., 1998).

Current research appears to point of plastic deformation within and of the axons that leads to the predominant cause of injury. The elastic tissues of the brain have plastic properties. Once the level of force is applied to a plastic substance, it is the time period over which it is applied that causes the amount of deformation. If the elastic memory of the substance is exceeded then there will be shearing and tearing. The high speed motor vehicle accident with deceleration lasting more than one to three seconds or several seconds of repetitive shaking can produce enough force for this to happen.

Materials research indicates that there is an amount of force which must be delivered below which plastic deformation of substances does not occur. In fact, the Gadd severity index initially attempted to measure the severity of injury utilizing an acceleration/time curve (Gadd, 1998). This critical amount of force appears to be essential in the development of injury (McLean & Anderson, 1997). This is very different from the contusive model of TBI where the forces are applied over milliseconds.

In nonhuman primates, this type of DAI has been induced utilizing a non-impact rotational device (Marguiles et al., 1990; Kobayashi et al., 1989). However, nonhuman primates are expensive models with significant limitations that do not lend themselves to extensive preclinical pharmaceutical and interventional trials. In rats, some DAI is found around the area of contusive injury (Meaney, 1994) but this is likely due to a small amount of localized shear forces. The sites of injury in a contusive model in rats do not conform to the areas of the brain associated with human injuries: the brain stem, corpus callosum and midbrain (Blumbergs, 1994).

More evidence is available on the mechanism of injury from the so-called "shaken baby syndrome" (Nelson et al., 1993). This mechanism of injury induces a DAI due to shaking the infant in a repeated coronal plant with or without rotational forces and there are often associated injuries to the optic nerve with this type of injury (Nelson et al., 1993). In animals, repeated coronal shaking of the head has been reported to produce some DAI utilizing miniature pigs (Ross et al., 1994; Kimura et al., 1996; Smith et al., 1997). In addition, similar histopathologic findings to the optic nerve injuries associated with the "shaken baby syndrome" have been noted after direct stretching of the optic nerves of guinea pigs (Maxwell et al., 1997).

This indicates that once the amount of force has reached a threshold, it is the length of time the force is applied with the associated plastic deformation that is the predominant factor which causes the intracellular damage to the organelles within the axon. Hence, there is a continuum over which DAI occurs in TBI. After the threshold of necessary force to create plastic deformation is reached, it may be the length of time over which it is applied that determines the amount of DAI. This would explain the findings of Foda et al. (1994) where some DAI was noted in areas adjacent to a contusion injury in rats. Unfortunately, most TBI occurs over several seconds (high speed transportation crashes) where DAI is likely to be the predominant method of injury. This is supported by the fact that many severe TBI patients have minimal changes noted on CT scan following motor vehicle crashes.

Motor vehicle crashes are the predominant cause of DAI. A component of DAI is felt to be present in all motor vehicle crashes where the patient has lost consciousness (Whyte, 1988). For many years, DAI has been known to be associated with a coma of immediate onset after brain injury, but the diagnosis could only be established by autopsy. Indeed, the clinical syndrome of coma without any preceding lucid interval, decerebration, and autonomic dysfunction were often ascribed to primary brainstem injury. However, it is now clear that primary brainstem lesions do not occur in isolation but rather in association with DAI and usually involve the cerebral hemispheres and cerebellum in addition to the brainstem (McLellan, 1990). Evidence of the mechanism of injury can be elicited by pathological studies of patients killed from high speed transportation injuries (Pounder, 1997) as well as pathological studies of "shaken baby syndrome," a distinct subset of DAI (Nelson et al. 1993). A recent case report (Pounder, 1997) indicates that this shaking mechanism of DAI injury also applies to adults. The injury is characterized by specific neuropathological findings. On CT and MRI, this usually involves hemorrhagic punctate lesion of the corpus callosum, pontine-mesencephalic junction adjacent to the superior cerebellar peduncles and diffuse axonal damage in the white matter of the brain, brainstem and cerebellum which begin to atrophy within two weeks after injury (Whyte, 1988; Blumbergs, 1994).

Diffuse axonal injury in humans is characterized by widespread damage to axons in the cerebral hemispheres, the cerebellum and the brain stem and is a consistent feature of TBI (Adams, 1977; Adams, 1989; McLellan, 1990). The histological features of DAI depend on the length of time after injury, but within a day or so after injury there is evidence of damage to axons in the form of axonal bulbs. The initial findings are usually characterized microscopically utilizing neurofibrillar stains and stains for microglia which are abundant in the degenerating white matter. These findings are produced by the shear or flow of cytoplasm from the proximal end of a severed axon. Subsequently, the microscopic features correspond to Wallerian-type axonal degeneration as the axon disintegrates, which is probably due to metabolic disruption from injury and damage to the internal organelles from the lack of membrane integrity. In the first two years there is active myelin degeneration and in patients surviving longer, demyelination is the final stage of the process (McLellan, 1990). The result of the traumatic injury to the axons leads to the disconnection with various target sites, which is assumed to translate into the morbidity seen (Gennarelli, 1982; Povlishock, 1992). The severity of injury based on the histopathological changes has been graded in humans but not in experimental animals (Adams, 1977; Adam, 1989). The Adams classification (Adams, 1977; Adams, 1989) is used in human autopsy material, to classify the degree of DAI as mild, moderate or severe. In this classification, mild (grade 1) is characterized by microscopic changes in the white matter of the cerebral cortex, corpus callosum, and brain stem and occasionally in the cerebellum. Moderate (grade 2) is defined based on focal lesions in the corpus callosum. In severe (grade 3), there are additional focal lesions in the dorsolateral quadrants of the rostral brain stem (commonly in the superior cerebellar peduncle). This scheme has not been used for non-primate models because different regions of the brain are injured in the present models. However, it may be possible to apply this scheme to an appropriate model of DAI in small animals that is currently under development.

It has been difficult to correlate the severity of injury in humans with animal models. Animals cannot be accurately assessed by the Glasgow Coma Scale (Jennet, 1981), the Disability Rating Scale (Rappaport, 1982) or the length of post traumatic amnesia (Bishara, 1992). However, there are methods to measure the balance of animals and test their spatial memory and learning acquisition. Although non-human primates most closely resemble humans, monkeys are expensive to study. Most preclinical pharmacological studies involve rats because they are easily studied and relatively inexpensive so that large scale testing can be done. Yet, there has been no reliable reproducible rat model for DAI in the literature. There are problems, clearly the anatomy and geometry of the rat brain are less similar to the human brain than a monkey. However, by using engineering to replicate the mechanical aspects of diffuse axonal injury, the changes that occur in the rat brain are projected to be quite similar to the human condition.

The two most common animal models of human head injury are the fluid percussion and impact acceleration or weight-drop method. Fluid percussion models produce brain injury by rapidly injecting saline or blood into the closed cranium either at the midline (McIntosh et al. 1984) or laterally (McIntosh et al., 1989a). Unfortunately, these are not ideal models of human diffuse axonal injury. The models more closely replicate some of the features of subarachnoid hemorrhage. The impact acceleration (Lighthall, 1988) and the weight-drop methods (Shohami et al., 1994) both involve creating an indentation into the brain. Although some diffuse axonal injury occurs with these models, DAI is present in different areas and involve a disproportionately small volume than in humans. In order to develop a better animal model that includes diffuse axonal injury in the forebrain as is characteristic of human diffuse axonal injury, Meaney and colleagues in 1994 modified the impact-acceleration model. This new cortical impact model involves creating an indentation (1.5 mm indentation, 4.7 m/sec velocity, 22 msec dwell time) on the motor cortex combined with a contralateral craniotomy. Unfortunately, this model still lacks many features of human diffuse axonal injury. Yet another model of DAI in rats, involves dropping a weight onto a metallic disc fixed to the skull (Foda and Marmarou, 1994). Although some features of human diffuse axonal injury are seen, there are considerable amounts of brain edema and neuronal injury directly under the area of impact. This model was designed to create enough energy to reach the threshold for which some DAI will develop (McLean and Anderson, 1997). However, in models where DAI is found secondary to a contusive injury, studies directed at evaluating a treatment for DAI will be severely hindered.

In animals, repeated coronal shaking of the head has been reported to produce some DAI utilizing miniature pigs (Ross et al., 1994; Kimura et al., 1996; Smith et al., 1997). In addition, similar histopathologic findings to the optic nerve injuries associated with the "shaken baby syndrome" have been noted after direct stretching of the optic nerves of guinea pigs (Maxwell et al., 1997). In nonhuman primates, this type of DAI has been induced utilizing a non-impact rotational device (Marguiles et al. 1990; Kobayashi et al., 1989). However, nonhuman primates are expensive models with significant limitations that do not lend themselves to extensive preclinical pharmaceutical and device interventional trials.

Maxwell, Povlishock and Graham (1997) states that with the current animal models of diffuse axonal injury, axonal injury does not occur in the parasagittal white matter or corpus callosum which are the most frequent sites of axonal injury in human diffuse axonal injury. They go on to suggest that the term "diffuse axonal injury" not be used in animal models because the animal models differ from human diffuse axonal injury. The most similar model to human DAI was a primate model of DAI in which monkeys were exposed to acceleration and deceleration in the oblique, lateral and sagittal planes (Gennarelli, 1982). While the injury induced was similar to humans, primate models are prohibitively expensive when considering preclinical therapeutic interventions.

All of the clinical trials evaluating treatments for traumatic brain injury have failed. The reason for this failure may be the lack of an adequate injury model in small experimental animals such as rats and mice. An injury model that closely mimics human injury is essential in developing and evaluating treatments for patients with head injury. Applicants' efforts have been directed at producing a small animal model for the most common type of traumatic head injury called diffuse axonal injury (DAI).

The subject invention provides a small animal model that closely resembles human DAI, and essentially only DAI, in order to develop a successful treatment for DAI patients.

Similar to TBI models, in trying to develop a treatment for spinal cord injury, a critical step is to have a model that closely mimics the typical human injury. In most human spinal cord injuries, the force is directed from the anterior direction either from a burst fracture or a retropulsed disc. The force upon the spinal cord is not removed until traction or decompressive surgery can be performed. Swelling of the spinal cord occurs after injury. A new method of creating a spinal cord injury in animals has been developed to replicate the characteristics of a typical human spinal cord injury.

Heretofore, the most common model of spinal cord injury is the weight-drop method. The disadvantages of this method are: 1) the spinal cord is decompressed before injury, 2) the force is directed posteriorly, and 3) a transient force is applied upon the cord. The decompression is done before injury because it is necessary to perform a laminectomy (bone removed from the posterior surface of the spinal cord) before the weight is dropped onto the surface of the spinal cord. Removal of the bone allows room for expansion of the spinal cord as it swells after injury. The force is directed from the dorsal direction because it is very difficult to surgically approach the spinal cord from the dorsal direction especially in the case of an injury to the thoracic cord. The force upon the spinal cord is transient because the force is only from the impact of the weight. The advantage to this method is that it produces a contusive injury and that it can be replicated.

Another method that is used to injure the spinal cord is to cut the cord with a hemisection or transection. The disadvantage to this technique is that the cord in humans is only rarely cut but most often receives a contusive injury. The advantage to this method is that can easily be used to measure new growth of nerve cell processes.

Accordingly, it would be advantages and desirable to have accurate animal models of both TBI and spinal cord injury which closely approximate human TBI and spinal cord injury which overcome the drawbacks and disadvantages of the models described above and which isolates injury to essentially or substantially only DAI.

SUMMARY OF THE INVENTION

There is provided an apparatus for simulating human traumatic brain injury in an animal which includes a support having an aperture having end walls and side walls disposed therein. A sliding element is slidingly engaged with the side walls of the aperture and includes a retainer disposed thereon for receiving a human holder therein. A crank arm is operatively connected to both the sliding element and an actuator mechanism.

There is also disclosed a method of simulating human traumatic brain injury in an animal which includes the steps of providing an animal and repeatedly laterally displacing the animal in a reciprocal manner in order to cause acceleration and deceleration of the animal laterally to cause the animal's brain to be correspondingly accelerated and decelerated thereby causing traumatic brain injury.

There is also provided a method of simulating human spinal cord injury in an animal which includes the steps of providing a vertebrate animal having an invertebral space and a spinal cord. An opening is placed in the animal at the invertebral space to the interior surface of the spinal cord and a deflating embolectomy catheter is inserted into the opening. The embolectomy catheter is then rapidly inflated to cause the balloon catheter to expand and contact the spinal cord whereby the contact causes injury to the spinal cord.

BRIEF DESCRIPTION OF THE DRAWINGS

The following detailed description is best understood with reference to the following drawings in which.

DETAILED DESCRIPTION OF THE INVENTION

Figure 1:
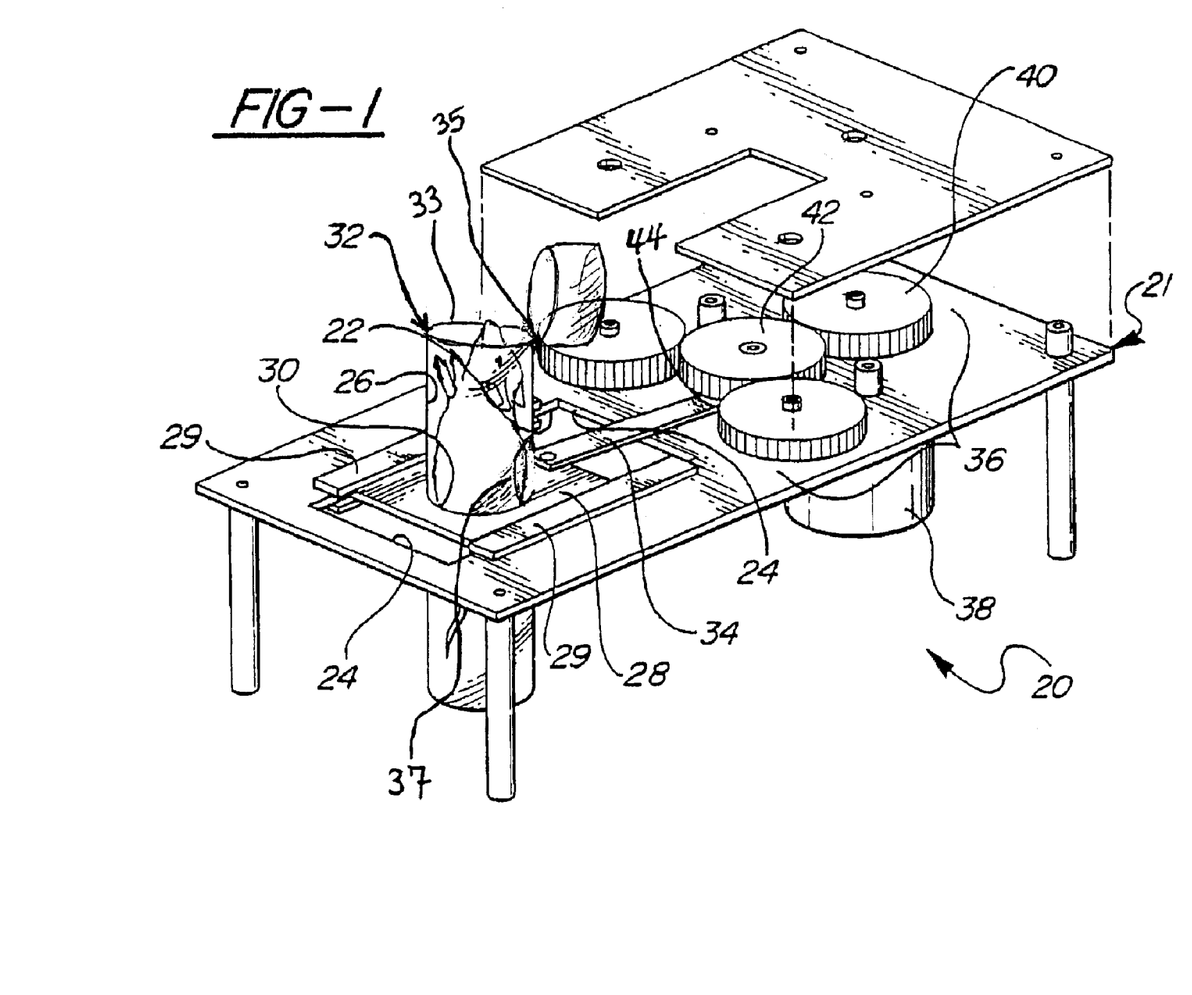
FIG. 1 is an isometric, partially exploded view of an apparatus of the present invention having an animal holder affording cervical movement beyond the holder.

Referring to FIG. 1, an apparatus for simulating human traumatic brain injury in an animal is generally shown at 20.

The apparatus 20 includes a support 21 having an aperture 22 disposed therein. The aperture 22 includes end walls 24 and side walls 26. A sliding element 28 is supported by and slidingly engage with glides, preferably made of nylon, which attached to the side walls 26 of the aperture 22. The sliding element 28 also includes a retainer 30 disposed therein for receiving an animal holder 32 therein. A crank arm 34 is operatively connected with both the sliding element 28 and an actuator mechanism 36.

The actuator mechanism 36 includes a drive motor 38 operatively connected to a drive gear 40. The drive gear 40 is operatively connected to a center gear 42. The crank arm 34 is adjustably connected to the center gear 42 at a point 44. The point 44 is capable of being varied or moved across the diameter of the center gear 42 in order to change the length of the crank arm 34 thereby changing the length of travel of the crank arm 34 allowing for the adjustment and/or variation of the amplitude of force applied to an animal disposed within the animal holder 32.

The retainer 30 typically includes an aperture. The animal holder 32 has an internal volume dimensioned to receive and retain an animal therein. It is appreciated that a variety of cross-sectional shapes are operative in an animal holder, these illustratively include circular, rectilinear, and higher polygonals. Preferably the animal holder 32 is a cylinder dimensioned to receive and retain an animal therein and be placed into the aperture. More preferably, the animal holder 32 has a hinged first end 33. A hinge 35 allows the first end 33 to be displaced relative to the remainder of the animal holder 32 in the course of inventive device kinematic motion of the animal holder 32. The displacement of the first end 33 during the kinematic motion eliminates the support afforded to the anatomy of an animal proximal to the first end 33. Typically, an animal is positioned in the holder 32 such that the animal head is proximal to the first end 33 thereby allowing the animal head movement upward and backward so as to reproducibly and more accurately simulate the cranial-cervical-spinal hyperflexural trauma associated with actual injuries. It is appreciated that the positioning of an animal relative to the hinge 35 dictates the anatomical region experiencing hyperflexation. Since multiple animals can reproducibly be placed in the same position within the animal holder 32, the force trauma as well as the hyperflexural injury aspects are reproducibly inflicted on a number of animals. The ability to simulate injury in multiple animals under known and identical conditions affords a control animal in experiments intended to study and/or treat such injuries. Optionally, the animal holder 32 has a cutout along the length thereof 37. The cutout positioned to remove anatomical support from that portion of the animal during injury thereby placing additional forces on adjacent animal anatomical portions relative to the cutout so as to more accurately simulate certain types of human injuries. Preferably, a cutout when present overlies a portion of the spine of an animal. More preferably, a cutout overlies the lumbar or coccyx portion of an animal spine.

In operation, the actuator mechanism 36 and the crank arm 34 cause the sliding element 28 to reciprocate within the aperture 22. The animal disposed within the animal holder 32 is then rapidly moved in a first direction and, then, is rapidly moved in a second direction opposite the first direction thereby causing a traumatic brain injury. The motion produced by this device has a known kinematics history. The kinematics history provides an exact solution for the displacement function and is characterized by the equation.

The motion produced by the device has a known kinematics history. An exact solution exists for the displacement function, and it is given by $$S = a \cos \Box + (a^2 \cos^2 \Box - a^2 + b^2)^{0.5}$$

where (a) is the length of the crank link, (b) is the length of the crank arm, and ($\Box$) is the angular position of the crank defined by $$\Box = wt$$

where (w) is the angular velocity and (t) the time.

Figure 2:
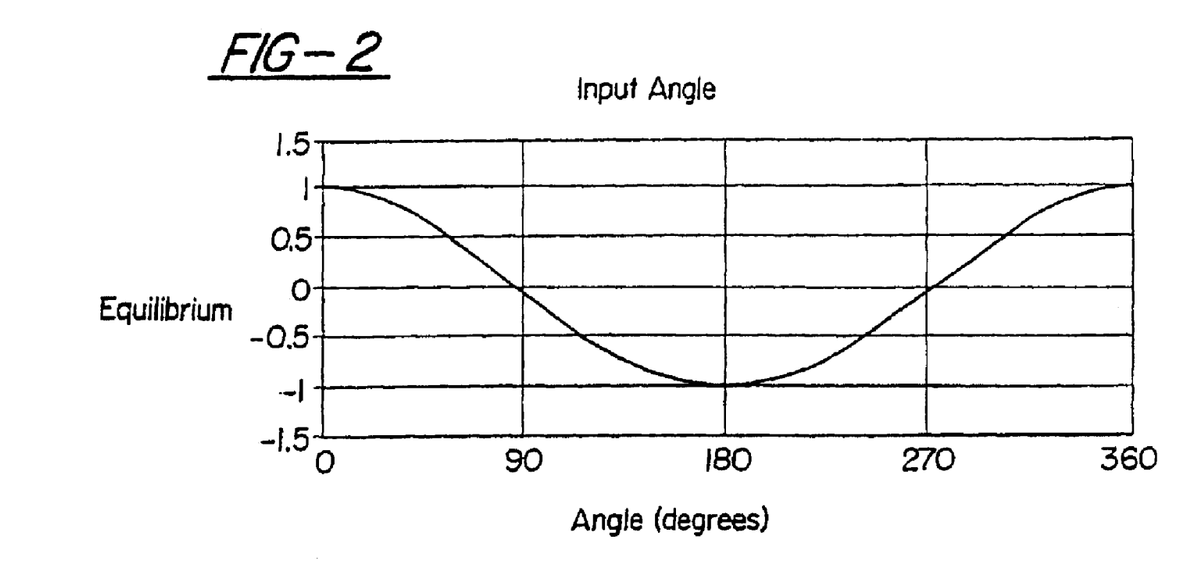
FIG. 2 is a graph depicting the displacement function of a sliding element of the subject invention with respect to angular rotation.

An example variation of displacement is shown in FIG. 2 where the crank length was one inch, resulting in an amplitude of two (2.0) inches, and a connecting rod length of seven inches as in the actual device. A similar relationship exists for the acceleration which can be used to derive the momentum history and the force applied. The equation for acceleration is given by $$A = -w\, a \cos \Box (1 + a \cos \Box/(b^2 - a^2 \sin^2)^{0.5}) = w^2\, a^2 \sin^2(1 + 2a^2 \cos^2/b^2 - a^2 \sin^2 \Box/(b^2 - a^2 \sin^2)^{0.5}$$

Energy levels to which an animal is subjected will depend on the history of the two above parameters as well as the mass distribution over the body. For each particular animal tested, the energy function may be investigated as a possible parameter. In such a case, measured rather than kinematically prescribed motion parameters should be used. It is understood that the response of soft and hard tissue to the imposed motion will depend on a multitude of parameters. Even though one set of parameters is entered through the testing device drive, the body will undergo a motion determined by the dynamic response of a continuous system. The head does not move the same as the body because it is attached by a flexible neck and is optionally exposed to a greater range of motion by placement proximal to the hinged first end.

A more precise setup would include accelerometers to precisely measure the levels of acceleration induced on the head. This approach will eliminate measurement errors caused by the assumed acceleration and deceleration levels to which the head is subjected. High speed video will also assist in evaluating the precision with which the system induces the input kinematic parameters as well as the level of rotational acceleration and deceleration induced by the electric motor and the clutch system which starts and stops the mechanism.

The apparatus 20 was designed and built to facilitate studies and modeling of injuries which closely resemble human injury. Since the range of frequency and amplitude that would generate adequate inertial forces was known, the animal holder 32 is designed with a continuously adjustable frequency and amplitude. That is, the cylinder or pipe, preferably made of polyvinyl chloride, containing the animal is programmed to vibrate at a particular amplitude (A) and frequency (F). The functional description of the animal position:

$$X(t) = A \sin Ft$$

The acceleration/deceleration experienced by the animal's body is found from the known mathematical relationship:

$$\ddot{X}(t) = D^2 X/Dt^2 = -D^2 A \sin Ft$$

As stated above, the mechanism of the apparatus 20 was designed to provide a variable crank link. The variable crank link allows the amplitude to assume very small values by means of adjustment which is accomplished by moving the attachment point 44 of the crank 34 closer to the center of rotation of the center gear 42. To accomplish this goal, a centerless planetary gear drive allows access to its entire diameter for adjustment of the input link and the drive gear 40 can be used as a coupling mechanism with the actuator mechanism 36.

In operation, an animal, such as a rat, is placed within the animal holder 32 and the animal holder 32 is placed within the retainer 30. The apparatus 20 is activated and the animal is caused to reciprocate back and forth for a determined period to time in order to cause traumatic brain injury (TBI).

Also disclosed herein is a method for simulating human spinal cord injury in animals. In this method, a 2-French Fogarty balloon embolectomy catheter (Baxter Cardiovascular) is threaded through a small opening at the intervertebral space to the anterior surface of the cord to create a closed injury (no bone removal) and is quickly inflated using a weight drop device that impinges on the barrel of the syringe that inflates the catheter. A pressure transducer is used to measure the pressure changes in the catheter so that the consistency of injury can be measured. The parameters have been determined to create a mild, moderate and severe level of injury. The degree of injury can be manipulated by increasing the amount of weight dropped or the distance that the weight is dropped or the length of time that the catheter is inflated.

The location of the various pathways in rats is known. There is reason to think that a different injury is created using this balloon catheter model because only limited functional recovery normally occurs unlike the weight-drop method. This may be due to differences in the particular pathways injured in the two models. The vestibulospinal and reticulospinal are located in the ventrolateral part of the cord and may be more severely damaged with the force directed from a ventral position. The position of the major pathways and nerve cell groups are very similar between humans and rats so that an injury with a force from the anterior direction (most common in human injuries) will create a particular type of injury.

For all of the injury surgeries, the following protocol is and should be followed: The surgical table will be cleaned with 70% alcohol before and after each use. Adult Sprague-Dawley rats (200–250 g) obtained from Charles River are given 0.25 ml/kg Ketalar (100 mg/ml) IM. After fifteen minutes, the animals are deeply anesthetized with halothane (1.5–2.5% with oxygen at 1 liter/minute). The back of the animal is shaved with clippers then cleaned with Betadine scrub followed by cleaning with Betadine solution. Ointment is applied to the eyes to prevent drying. The animal is then placed on water circulating heating pad covered with a sterile towel on the surgery table and draped with sterile towels so that only the surgical region is exposed. Aseptic procedures are followed for the surgery: only autoclaved, sterile instruments, gauze, applicator sticks, etc. are used and sterile gloves and masks will be worn. During the surgery, the breathing rate of the animal is monitored almost continuously and a toe pinch reflex is tested about every ten minutes for any response to pain. The level of halothane is increased if there is any response to pain or discomfort. During surgery, notes are kept on each animal.

An incision is made dorsal to the spinal column and thoracic vertebrae exposed. A small opening is made at the lateral surface of the T10/T11 intervertebral space. A 2-French Fogarty balloon catheter (Baxter Cardiovascular) was inserted through the opening and guided 6 mm rostrally to lie ventral to the rat spinal cord. The catheter was then quickly inflated using a syringe in which the barrel of the syringe is impinged with a weight that is dropped a specific distance. The pressure changes within the catheter are recorded using a pressure transducer that is connected to oscilloscope. Typically the catheter is kept inflated for fifteen minutes then removed. The muscles then the subcutaneous tissue are closed with absorbable suture. The skin is closed with wound clips. Rats are given 3–4 cc Lactated Ringers SQ then taken off the Halothane. Rats receive oxygen and are kept on the water circulating heating pad until alert. The rats are usually fairly alert within ten minutes. Behavioral testing is done each week. The results of the behavioral testing to date on the ten animals are given in the graphs.

The animal is monitored fairly continuously until alert then is monitored every thirty minutes for the next three-four hours. If the animal appears to be in pain, Buprenex is given (0.03 mg/ml, 0.01 ml/kg). Rats are given tetracycline in their water bottles for ten-fourteen days after surgery. Tetracycline solution in water bottles is changed daily. Bladders are expressed manually at least four times daily until bladder reflexes return in the seven-fourteen days following the lesion. After the initial recovery period, animals are returned to the animal care facility. Post-operative rats are caged singly for one-two weeks. Animals will be weighed daily during the first week then weighed weekly until treated. Wound clips or the non-absorbable suture are removed fourteen days after surgery.

All animals are checked daily including week-ends and holidays. A record of the daily animal check is kept for each animal until the rat is sacrificed. The daily animal check always includes checking the bladder and checking for dehydration. We keep daily (or more frequently) records of the following: size of the bladder (small, medium or large), condition of the bladder (soft or firm), appearance of the expressed urine (clear, cloudy or bloody), hindlimb movements, any medications given, condition of the incision, presence of feces, and if the animal is rinsed and dried or washed and dried. If the animal is dehydrated, rats are given 3–4 cc lactated ringers SQ as needed.

EXPERIMENTAL EXAMPLES

TBI Model

In the first and second trials, six rats were anesthetized with Pentobarbital. In the third trial, rats were anesthetized with Pentothal (50 mg/kg), IP. The rats then were placed in a Lomir jacket (long type, with openings for the front and hind paws) that is attached to the walls of the foam-lined padded PVC pipe so that the rat's body is held in the fixed position (that is consistent between animals) in the tube while the neck and head move freely. A small piece of tubing was placed over the front teeth to prevent injuries to the tongue. The PVC pipe serves as an animal holder and is connected to the machine illustrated in FIG. 1 that in turn attaches to a milling machine to provide power.

In the first trial, rats were sacrificed at five minutes, four hours or five days after injury and the brains and eyes were sectioned for histological analysis. In the second trial, all rats were sacrificed at ten days after injury. Six additional control rats were anesthetized but not injured.

Half of each brain was cut on a freezing, horizontal-sledge type microtome at 40 $\mu$m thickness. The other half of each brain was cut at 10 $\mu$m on the cryostat or at 2–3 $\mu$m after JB-4 (plastic) embedding. The following stains were used on the sections: hematoxylin & eosin, Richardsons, toluidine blue with pararosaniline, and modified Bielschowsky silver stain. Silver stain (Crooks, 1991 a & b) and hematoxylin and eosin (Gultekin and Smith, 1994) are reported to be particularly useful after DAI.

Immunohistochemical staining was also done using several antibodies because the swellings and retraction bulbs following DAI are immunopositive for ubiquitin (Schweitzer et al., 1993), neurofilament (Yaghmai and Povlishock, 1992; Grady et al., 1993; Christman et al., 1994) and amyloid precursor protein (Sherriff et al., 1994; Blumbergs et al., 1994; Gentleman et al., 1995; McKenzie et al., 1996). For the immunohistochemistry, sections or slides are washed three times in phosphate-buffered saline (PBS, 0.1 M phosphate buffer, 0.9% saline, pH 7.4). Blocking is done using 10% normal serum in PBS with 0.3% triton-X. For the neurofilament staining, goat serum was used and rabbit serum for the ubiquitin and the APP. Sections were placed for two days at four degrees C. in a 1:2000 dilution of the following primary antibodies: Sigma rabbit anti-neurofilament 200, Chemicon goat anti-amyloid precursor protein, Chemicon sheep anti-ubiquitin antibody, Chemicon rabbit anti-neurofilament 200, Chemicon rabbit anti-neurofilament 150. Control sections did not received primary but were processed with all of the remaining steps. After washing three times in PBS, sections were placed in horseradish peroxidase conjugated to affinity purified secondary antibody (Chemicon goat anti-rabbit or Chemicon rabbit anti-sheep or rabbit anti-goat). After washing three times in PBS, sections were reacted using Pierce enhanced DAB substrate kit.

In the first trial, two of the six rats died of the injury. Two of the others appeared to have significant injury with respiratory distress and were perfused immediately. One rat did not recover from anesthesia and was perfused at four hours after injury. The remaining rat was perfused after five days. This rat was tested using the von Euler beam test and the inclined plane. On the day after injury, the rat appeared to be in perfect health with no visible signs of pain or distress. However, the rat was unable to cross a beam that was wider (7.7 cm) than the width of the rat. By the third day, the rat improved its performance and was able to cross a beam that was 4.4 cm wide. By the fourth day, the rat was able to cross the narrowest beam that was 1.1 cm wide. However, the rat was unable to maintain its position on an inclined plane at the same angle as a normal rat suggesting persisting deficits in maintaining balance.

In the second trial, all six rats survived. Five of the six rats could successfully cross the narrowest beam by three days post injury. However, the rats did not cross it normally with each rat having at least three footfalls in crossing the beam. The number of footfalls was quantified from the videotapes of the testing. Normal rats do not exhibit footfalls in crossing the beam. The sixth rat that was shaken at the highest frequency could not cross a 4.7 beam at ten days post-injury. All of the rats were abnormal on the inclined plane test. Normal rats can maintain their position on the incline plane for at least five second at 45° and the rats with head injuries could not.

In the animals that survived four hours or five days in the first trial, there were a number of axons that appeared swollen. The axonal swellings or retraction bulbs were present in the subcortical white matter, internal capsule, corpus callosum and superious cerebellar peduncle. The modified Bielschowsky silver stain clearly stained the axons and their fine processes. The neurofilament antibody also clearly labeled the axons.

Figure 3A:
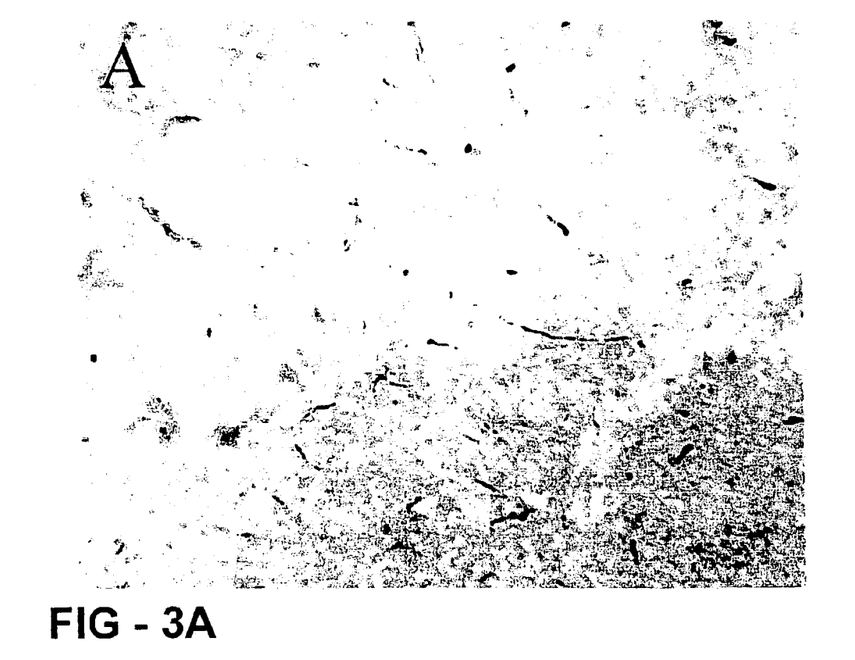
FIGS. 3A–B are photographs of axons from parasagittal white matter of the cerebral cortex.
Figure 3B:
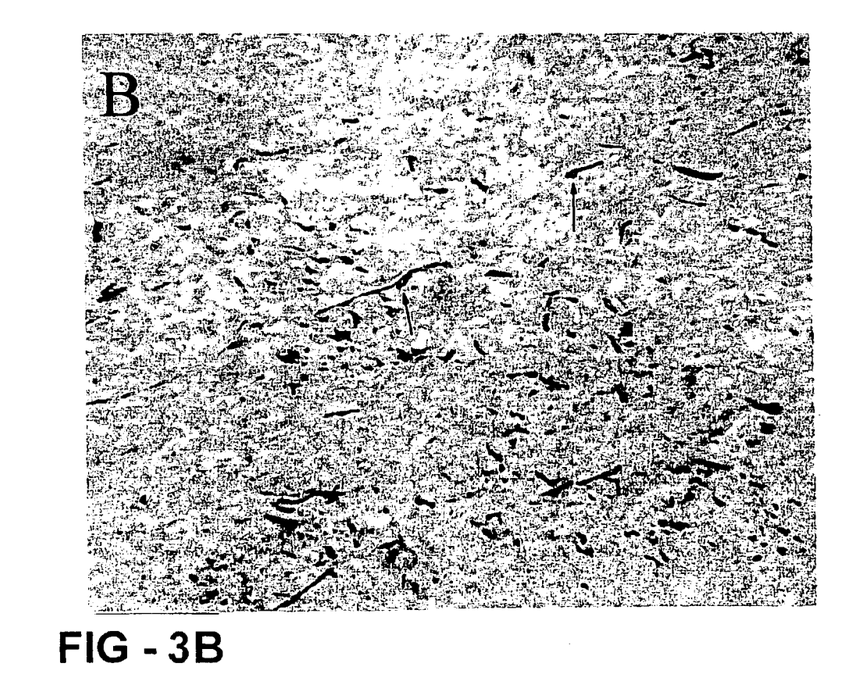
Figure 3C:
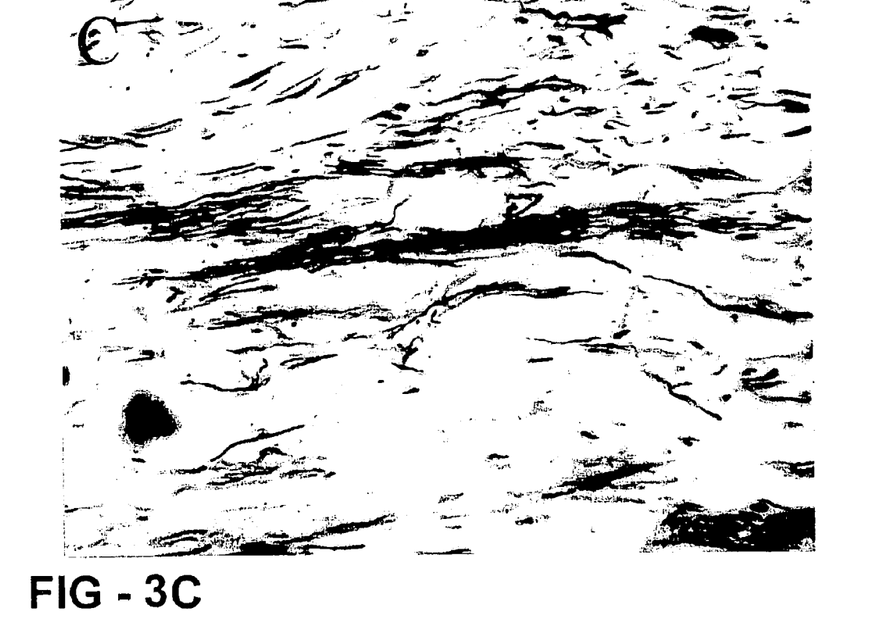
FIGS. 3C–D are photographs of axons from the dorsolateral brainstem.
Figure 3D:
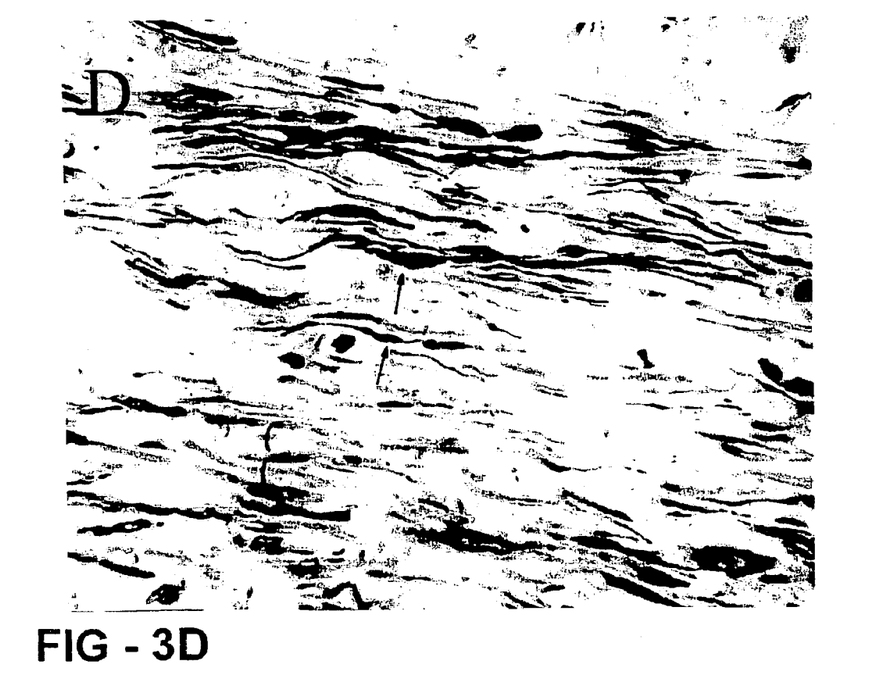

In the second trial where the animals survived for ten days, axonal swelling and retraction bulbs were more common than in the animals from the first trial. A similar distribution of abnormal axons was observed. The animal with the greatest functional deficits (abnormal beam test at ten days) had the greatest amount of brain pathology. Focal lesions of the brain were observed at the gross level during sectioning. In the parasagittal white matter of the cerebral, cortex, every field had one to several abnormal axons. Examples of axonal swellings and bulb stained by modified Bielschowsky silver stain from this animal in the parasagittal white matter are shown in FIG. 3B. In FIG. 3A is an example of a field in the same region from an animal with no functional deficits. Similar abnormalities were observed in the dorsolateral brainstem using neurofilament immunohistochemistry as shown in FIG. 3D. In FIG. 3C, are examples of axons from one of the animals with no functional deficits. Axons that are coursing perpendicular to the surface of the section are not included in the analysis because normal axons sometimes appear as slightly swollen as the axons reach the cut surface of the section.

In view of the teaching presented herein, other modifications and variations of the present inventions will be readily apparent to those of skill in the art. The foregoing drawings, discussion, and description are illustrative of some embodiments of the present invention, but are not meant to be limitations on the practice thereof. It is the following claims, including all equivalents, which define the scope of the invention.

Any patents or publications mentioned in this specification are indicative of the levels of those skilled in the art to which the invention pertains. These patents and publications are herein incorporated by reference to the same extent as if each individual publication was specifically and individually indicated to be incorporated by reference.

One skilled in the art will readily appreciate that the present invention is well adapted to carry out the objects and obtain the ends and advantages mentioned, as well as those inherent therein. The present examples along with the methods, procedures, treatments, molecules, and specific compounds described herein are presently representative of preferred embodiments, are exemplary, and are not intended as limitations on the scope of the invention. Changes therein and other uses will occur to those skilled in the art which are encompassed within the spirit of the invention as defined by the scope of the claims.

What is claimed is:

1. An apparatus for simulating human traumatic brain injury in an animal, said apparatus comprising:

a support having an aperture having end walls and side walls disposed therein;

a sliding element slidingly engaged with said side walls of said aperture, said sliding element having a retainer comprising an aperture disposed thereon for receiving an animal holder within said aperture; and a crank arm operatively connected to both said sliding element and an actuator mechanism;

said animal holder having a wall defining an internal volume dimensioned to receive and retain the animal therein, wherein said animal holder has a hinged first end.

2. An apparatus as set forth in claim 1, wherein said actuator mechanism includes a drive motor.

3. An apparatus as set forth in claim 1, wherein said drive motor is operatively connected with a drive gear, said drive gear being operatively connected to a center gear.

4. An apparatus as set forth in claim 3, wherein said crank arm is adjustably connected to said center gear at a point, said point capable of being varied across the diameter of said center gear to change the length of said crank arm whereby length of travel of said crank arm can be adjusted to vary the amplitude of force applied to an animal.

5. An apparatus as set forth in claim 1, wherein said animal holder is a cylinder.

6. The apparatus as set forth in claim 1 wherein the wall of said animal holder has a cutout therein.

7. An apparatus as set forth in claim 1, wherein said actuator mechanism and crank arm cause said sliding element to reciprocate within said aperture.

8. A method of simulating human traumatic injury in an animal, said method comprising:

placing the animal in an animal holder;

inserting said animal holder into a sliding element having a crank link and a crank arm; and moving said animal holder and said sliding element with a displacement function S defined by:

$$a \cos wt + (a^2 \cos^2 wt - a^2 + b^2)^{0.5}$$

where (a) is the length of the crank link, (b) is the length of the crank arm, and (G) is the angular position of the crank defined by $$G = wt$$

where (w) is the angular velocity and (t) the time.

9. The method of claim 8 wherein said animal holder has a wall defining an internal volume dimensioned to receive and retain the animal therein, wherein said animal holder has a hinged first end.

10. The method of claim 9 wherein said animal holder is a cylinder.

11. The method of claim 8 wherein the wall of said animal holder has a cutout therein.

* * * * *